(12) United States Patent
Thomas

(10) Patent No.: US 11,910,929 B2
(45) Date of Patent: *Feb. 27, 2024

(54) SYSTEMS AND METHODS FOR ADJUSTING THE FIRMNESS AND PROFILE OF A MATTRESS ASSEMBLY

(71) Applicant: Sealy Technology, LLC, Trinity, NC (US)

(72) Inventor: Darin T. Thomas, Salisbury, NC (US)

(73) Assignee: SEALY TECHNOLOGY, LLC, Trinity, NC (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/347,913

(22) Filed: Jun. 15, 2021

(65) Prior Publication Data

US 2021/0307533 A1    Oct. 7, 2021

Related U.S. Application Data

(62) Division of application No. 15/568,342, filed as application No. PCT/US2015/027278 on Apr. 23, 2015, now Pat. No. 11,058,227.

(51) Int. Cl.
*A47C 27/08* (2006.01)
*A47C 27/06* (2006.01)
(Continued)

(52) U.S. Cl.
CPC .......... *A47C 27/083* (2013.01); *A47C 27/061* (2013.01); *A47C 27/062* (2013.01);
(Continued)

(58) Field of Classification Search
CPC ... A47C 27/061; A47C 27/062; A47C 27/064; A47C 27/082; A47C 27/083; A47C 27/10; G05D 16/208
See application file for complete search history.

(56) References Cited

U.S. PATENT DOCUMENTS

| | | |
|---|---|---|
| 1,371,919 A | 3/1921 | Mahoney |
| 2,604,641 A | 7/1952 | Reed |

(Continued)

FOREIGN PATENT DOCUMENTS

| | | |
|---|---|---|
| CA | 2013550 | 9/1991 |
| CA | 1290505 | 10/1991 |

(Continued)

OTHER PUBLICATIONS

International Searching Authority, International Search Report and Written Opinion for PCT/US2015/027278, dated Jan. 19, 2016, 13 pages.

*Primary Examiner* — Justin C Mikowski
*Assistant Examiner* — George Sun
(74) *Attorney, Agent, or Firm* — Stites & Harbison, PLLC; Terry L. Wright

(57) ABSTRACT

In systems and methods for adjusting the firmness of a mattress assembly and/or modulating the pressure in a mattress assembly, a mattress assembly includes: a two-dimensional array of bladders; at least one pump that is in fluid communication with the bladders to provide air and/or fluid to the bladders; multiple valves that are interposed between the pump and the bladders to control the flow of air and/or fluid to or from the bladders; a pressure sensor operably connected to one or more of the bladders; and a controller in communication with the pump, the valves, and the pressure sensors. The controller is configured to selectively actuate the pump and one or more of the valves, while receiving feedback from the pressure sensors, in order to adjust the firmness of the mattress assembly and/or modulate the pressure in the mattress assembly.

12 Claims, 4 Drawing Sheets

(51) Int. Cl.
*A47C 27/10* (2006.01)
*G05D 16/20* (2006.01)

(52) U.S. Cl.
CPC .......... *A47C 27/064* (2013.01); *A47C 27/082* (2013.01); *A47C 27/10* (2013.01); *G05D 16/208* (2013.01)

(56) References Cited

U.S. PATENT DOCUMENTS

| | | | |
|---|---|---|---|
| 3,251,075 A | 3/1966 | Saltness et al. | |
| 3,605,145 A | 9/1971 | Graebe | |
| 3,644,949 A | 2/1972 | Diamond | |
| 3,919,730 A * | 11/1975 | Regan | A61G 7/05776 601/111 |
| 4,193,149 A | 3/1980 | Welch | |
| 4,225,989 A | 10/1980 | Corbett et al. | |
| 4,435,862 A | 3/1984 | King et al. | |
| 4,644,597 A * | 2/1987 | Walker | A47C 27/087 5/711 |
| 4,762,231 A * | 8/1988 | Kiselewski | A45C 13/021 206/522 |
| 4,803,744 A | 2/1989 | Peck et al. | |
| 4,914,762 A | 4/1990 | Perali et al. | |
| 4,935,968 A | 6/1990 | Hunt et al. | |
| 4,986,738 A | 1/1991 | Kawasaki et al. | |
| 4,991,244 A | 2/1991 | Walker | |
| 4,993,920 A | 2/1991 | Harkleroad | |
| 4,995,124 A | 2/1991 | Wridge, Jr. et al. | |
| 5,020,176 A | 6/1991 | Dotson | |
| 5,051,673 A | 9/1991 | Goodwin | |
| 5,070,560 A | 12/1991 | Wilkinson | |
| 5,121,513 A | 6/1992 | Thomas et al. | |
| 5,182,826 A | 2/1993 | Thomas et al. | |
| 5,201,780 A * | 4/1993 | Dinsmoor, III | A61G 7/05715 5/679 |
| 5,233,974 A | 8/1993 | Senoue et al. | |
| 5,235,258 A | 8/1993 | Schuerch | |
| 5,235,713 A | 8/1993 | Guthrie et al. | |
| 5,325,551 A | 7/1994 | Tappel et al. | |
| 5,412,821 A | 5/1995 | Wilkinson | |
| 5,421,044 A | 6/1995 | Steensen | |
| 5,425,147 A | 6/1995 | Supplee et al. | |
| 5,487,196 A | 1/1996 | Wilkinson et al. | |
| 5,493,742 A | 2/1996 | Klearman | |
| 5,509,154 A | 4/1996 | Shafer et al. | |
| 5,544,376 A | 8/1996 | Fromson | |
| 5,561,875 A * | 10/1996 | Graebe | A61G 7/05707 297/180.13 |
| 5,586,348 A | 12/1996 | Toivio et al. | |
| 5,594,964 A | 1/1997 | Boyd et al. | |
| 5,598,593 A | 2/1997 | Wolfe | |
| 5,600,214 A | 2/1997 | Fromson | |
| 5,606,756 A | 3/1997 | Price | |
| 5,621,934 A | 4/1997 | Olkkonen et al. | |
| 5,638,565 A | 6/1997 | Pekar | |
| 5,647,079 A | 7/1997 | Hakamiun et al. | |
| 5,651,151 A | 7/1997 | Schild | |
| 5,652,484 A | 7/1997 | Shafer et al. | |
| 5,652,985 A | 8/1997 | Wilkinson et al. | |
| 5,680,662 A | 10/1997 | Purdy et al. | |
| 5,699,570 A | 12/1997 | Wilkinson et al. | |
| 5,701,622 A | 12/1997 | Biggie et al. | |
| 5,727,270 A | 3/1998 | Cope et al. | |
| 1,737,999 A | 4/1998 | Halverson | |
| 5,765,246 A | 6/1998 | Shoenhair | |
| 5,794,288 A | 8/1998 | Soltani et al. | |
| 5,794,289 A | 8/1998 | Wortman et al. | |
| 5,815,864 A | 10/1998 | Sloop | |
| 5,815,865 A | 10/1998 | Washburn et al. | |
| 5,848,450 A | 12/1998 | Oexman et al. | |
| 5,903,941 A | 5/1999 | Shafer et al. | |
| 5,918,336 A | 7/1999 | Lee et al. | |
| 5,926,883 A | 7/1999 | Rechin et al. | |
| 5,963,997 A | 10/1999 | Hagopian | |
| 5,969,488 A | 10/1999 | Fromson | |
| 5,991,949 A | 11/1999 | Miller, Sr. et al. | |
| 6,008,598 A | 12/1999 | Luff et al. | |
| 6,014,784 A | 1/2000 | Taylor et al. | |
| 6,034,526 A | 3/2000 | Montant et al. | |
| 6,037,723 A | 3/2000 | Shafer et al. | |
| 6,061,856 A | 5/2000 | Hoffman | |
| 6,061,885 A | 5/2000 | Flick | |
| 6,079,065 A | 6/2000 | Luff et al. | |
| 6,106,576 A | 8/2000 | Fromson | |
| 6,115,861 A | 9/2000 | Reeder et al. | |
| 6,122,786 A | 9/2000 | Ball | |
| 6,148,461 A | 11/2000 | Cook et al. | |
| 6,178,578 B1 | 1/2001 | Soltani et al. | |
| 6,212,718 B1 | 4/2001 | Stolpmann et al. | |
| 6,223,369 B1 | 5/2001 | Maier et al. | |
| 6,243,894 B1 | 6/2001 | Kosumsuppamala et al. | |
| 6,253,401 B1 | 7/2001 | Boyd | |
| 6,286,167 B1 | 9/2001 | Stolpmann | |
| 6,295,675 B1 | 10/2001 | Ellis et al. | |
| 6,311,348 B1 | 11/2001 | Luff et al. | |
| 6,317,912 B1 * | 11/2001 | Graebe | A47C 23/047 5/655.8 |
| 6,353,949 B1 | 3/2002 | Flabo | |
| 6,378,152 B1 | 4/2002 | Washburn et al. | |
| 6,396,224 B1 | 5/2002 | Luff et al. | |
| 6,397,419 B1 | 6/2002 | Mechache | |
| 6,421,858 B1 | 7/2002 | Cuerel | |
| 6,430,763 B2 | 8/2002 | Kosumsuppamala et al. | |
| 6,460,209 B1 | 10/2002 | Reeder et al. | |
| 6,467,111 B1 | 10/2002 | Vrzalik et al. | |
| 6,467,113 B2 | 10/2002 | Ellis et al. | |
| 6,483,264 B1 | 11/2002 | Shafer et al. | |
| 6,487,739 B1 | 12/2002 | Harker | |
| 6,493,568 B1 | 12/2002 | Bell et al. | |
| 6,505,368 B1 | 1/2003 | Ellis et al. | |
| 6,546,579 B1 | 4/2003 | Leventhal et al. | |
| 6,550,086 B2 | 4/2003 | Boyd | |
| 6,560,492 B2 | 5/2003 | Borders | |
| 6,582,456 B1 | 6/2003 | Hand et al. | |
| 6,588,038 B1 | 7/2003 | Blondie et al. | |
| 6,591,437 B1 | 7/2003 | Phillips | |
| 6,611,979 B2 | 9/2003 | Welling et al. | |
| 6,651,283 B1 | 11/2003 | Cook et al. | |
| 6,658,680 B2 | 12/2003 | Osborne et al. | |
| 6,684,433 B2 | 2/2004 | Giori et al. | |
| 6,684,434 B2 | 2/2004 | Ellis et al. | |
| 6,686,711 B2 | 2/2004 | Rose et al. | |
| 6,687,935 B2 | 2/2004 | Reeder et al. | |
| 6,691,346 B2 | 2/2004 | Osborne et al. | |
| 6,694,556 B2 | 2/2004 | Stolpmann | |
| 6,698,046 B1 | 3/2004 | Wu | |
| 6,709,246 B2 | 3/2004 | Boyd | |
| 6,715,172 B2 | 4/2004 | Leventhal et al. | |
| 6,721,980 B1 | 4/2004 | Price et al. | |
| 6,735,799 B1 | 5/2004 | Ellis et al. | |
| 6,745,996 B1 | 6/2004 | Guthrie | |
| 6,757,925 B1 | 7/2004 | Toomer | |
| 6,763,541 B2 | 7/2004 | Mahoney et al. | |
| 6,782,574 B2 | 8/2004 | Totton et al. | |
| 6,785,923 B2 | 9/2004 | Karafa et al. | |
| 6,804,848 B1 | 10/2004 | Rose | |
| 6,807,698 B2 | 10/2004 | Torbet et al. | |
| 6,839,929 B2 | 1/2005 | Stolpmann | |
| 6,848,135 B1 | 2/2005 | Kohlman | |
| 6,848,138 B1 | 2/2005 | Maier et al. | |
| 6,877,178 B2 | 4/2005 | Chapman et al. | |
| 6,880,189 B2 | 4/2005 | Welling et al. | |
| 6,886,204 B2 | 5/2005 | Kesatshko | |
| 6,910,238 B2 | 6/2005 | Biggie et al. | |
| 6,922,863 B2 | 8/2005 | Giori et al. | |
| 6,952,852 B2 | 10/2005 | Reeder et al. | |
| 6,954,957 B2 | 10/2005 | Metzger et al. | |
| 6,957,461 B2 | 10/2005 | Osborne et al. | |
| 6,978,500 B2 | 12/2005 | Osborne et al. | |
| 6,983,502 B2 | 1/2006 | Boyd | |
| 6,990,700 B2 | 1/2006 | Chung | |
| 7,036,171 B2 | 5/2006 | Wu | |
| 7,036,172 B2 | 5/2006 | Torbet et al. | |

(56) References Cited

U.S. PATENT DOCUMENTS

| | | |
|---|---|---|
| 7,058,999 B2 | 6/2006 | Horitani et al. |
| 7,152,264 B2 | 12/2006 | Boyd |
| 7,171,708 B2 | 2/2007 | Osborne et al. |
| 7,246,389 B2 | 7/2007 | Taguchi et al. |
| 7,287,290 B2 | 10/2007 | Romano et al. |
| 7,321,811 B1 | 1/2008 | Rawls-Meehan |
| 7,353,555 B2 | 4/2008 | Lau |
| 7,367,073 B2 | 5/2008 | Boyd |
| 7,380,300 B2 | 6/2008 | Boyd |
| 7,389,554 B1 | 6/2008 | Rose |
| 7,398,571 B2 | 7/2008 | Souke et al. |
| 7,409,735 B2 | 8/2008 | Kramer |
| 7,424,761 B1 | 9/2008 | Graebe |
| 7,454,805 B2 | 11/2008 | Osborne et al. |
| 7,467,058 B2 | 12/2008 | Boyd |
| 7,610,642 B2 | 11/2009 | Boyd |
| 7,641,623 B2 | 1/2010 | Biondo et al. |
| 7,669,261 B2 | 3/2010 | Fruh et al. |
| 7,669,263 B2 | 3/2010 | Menkedick et al. |
| 7,694,372 B1 | 4/2010 | Boyd |
| 7,739,763 B2 | 6/2010 | Wang et al. |
| 7,865,988 B2 | 1/2011 | Koughan et al. |
| 7,883,478 B2 | 2/2011 | Skinner et al. |
| 7,979,169 B2 | 7/2011 | Rawls-Meehan |
| 8,006,332 B2 | 8/2011 | Lemire et al. |
| 8,032,960 B2 | 10/2011 | Rawls-Meehan |
| RE43,193 E | 2/2012 | Osborne et al. |
| 8,117,701 B2 | 2/2012 | Bobey et al. |
| 8,121,856 B2 | 2/2012 | Huster et al. |
| 8,125,318 B2 | 2/2012 | Heimbrock et al. |
| 8,572,783 B2 | 11/2013 | Moutafis |
| 8,656,539 B1 | 2/2014 | Boyd |
| 2006/0058627 A1 | 3/2006 | Flaherty et al. |
| 2006/0085919 A1* | 4/2006 | Kramer ............... A61G 7/05776 5/713 |
| 2008/0052830 A1 | 3/2008 | Koughan et al. |
| 2008/0066237 A1 | 3/2008 | Boyd |
| 2008/0172789 A1 | 7/2008 | Elliot et al. |
| 2008/0189865 A1 | 8/2008 | Bhai |
| 2008/0232982 A1 | 9/2008 | Boyd |
| 2010/0043148 A1* | 2/2010 | Rose ..................... A47C 27/18 5/711 |
| 2010/0139003 A1* | 6/2010 | Moutafis ............... A47C 27/081 5/655.3 |
| 2010/0257675 A1* | 10/2010 | DeMoss ............... A47C 27/065 5/716 |
| 2011/0138539 A1 | 6/2011 | Mahoney et al. |
| 2014/0259434 A1 | 9/2014 | Nunn et al. |
| 2018/0153310 A1 | 6/2018 | Thomas |

FOREIGN PATENT DOCUMENTS

| | | |
|---|---|---|
| CN | 2649058 Y | 10/2004 |
| CN | 1711981 A | 12/2005 |
| JP | 2008545513 A | 12/2008 |
| KR | 1020070055900 A | 5/2007 |

* cited by examiner

SYSTEMS AND METHODS FOR ADJUSTING THE FIRMNESS AND PROFILE OF A MATTRESS ASSEMBLY

CLAIM TO PRIORITY

This divisional patent application claims priority to and benefit of, under 35 U.S.C. § 121, U.S. National Stage Patent Application having Ser. No. 15/568,342, filed on Oct. 20, 2017, which claims priority to PCT Application having Serial Number PCT/US2015/027278, filed on Apr. 23, 2015, all of which is incorporated by reference herein.

TECHNICAL FIELD

The present invention relates to systems and methods for providing a mattress assembly having an adaptable and adjustable sleep surface. The firmness and profile of the mattress assembly, and of the sleep surface in particular, can be adjusted, for example, in response to user input, applied pressure, change(s) in pressure, predetermined pressure schemes and/or applied routines, various auditory stimuli, and/or any combination thereof.

BACKGROUND

Many traditional mattress systems are static in their ability to adapt or adjust the conformance of a sleep surface to meet the needs of a user. This leads to user problems, such as: (i) areas of high pressure on the skin; (ii) misalignment of the spine; (iii) poor blood circulation; (iv) tired and fatigued muscles; (v) lack of adjustment when repositioning; and other problems associated with an overall poor sleep. Accordingly, advancements in the design of mattress systems that enable adaptability or adjustability of the sleep surface to respond to a user's preferences and/or to provide improved comfort would be both highly desirable and beneficial.

SUMMARY

The present invention provides systems and methods for adjusting the firmness and profile of a mattress assembly and/or modulating the pressure in a mattress assembly.

In some embodiments, the present invention is directed to systems for adjusting the firmness and profile of a mattress assembly, comprising: (i) a mattress assembly including a two-dimensional array of bladders; (ii) at least one spring provided within each of the bladders; (iii) at least one pump that is in fluid communication with the bladders to provide air and/or fluid to the bladders; (iv) multiple valves that are interposed between the pump and the bladders to control the flow of air and/or fluid to or from the bladders; (v) a pressure sensor operably connected to one or more of the bladders; and (vi) a controller in communication with the pump, the valves, and the pressure sensors. The controller is configured to selectively actuate the pump and one or more of the valves, while receiving feedback from the pressure sensors, in order to adjust the firmness of the mattress assembly. In various embodiments, any or all of the bladders in the array may comprise a bellows, an elastic chamber, an air-tight chamber, and/or a water-tight chamber. In some embodiments, at least one spring is also provided in each bladder in the array to improve "bounce" for a mattress assembly. For example, in one preferred embodiment, a first spring and a second spring are positioned inside of each bladder, with the first spring and the second spring being concentrically arranged. In some embodiments, the first spring is a tension spring that is positioned within the body of the second spring, which is a compression spring.

The present invention is also directed to methods for adjusting the firmness and/or profile of a mattress assembly, comprising, for example, the steps of: (i) providing a mattress assembly comprising an external sleep surface and an internal two-dimensional array of bladders; (ii) detecting a pressure level in each bladder; (iii) monitoring a pressure level in each of the bladders to detect a pressure change in at least one bladder of the array; and (iv) adjusting the pressure level in the bladder(s) in response to a pressure change to provide a desired firmness and/or profile.

In some embodiments, the present invention is further directed to methods for modulating the pressure in a mattress assembly. Such methods may include, for example, the steps of: (i) providing a mattress assembly comprising an external sleep surface and an internal two-dimensional array of bladders; (ii) detecting a pressure level in each bladder; (iii) providing a controller that is operably connected to the array of bladders, wherein the controller stores and receives a selection of one or more routines directed to a selected timing for inflating and deflating one or more bladders in the array; and (iv) using the controller to apply one or more of the routines to the array of bladders in order to adjust a pressure level in at least one bladder in the array.

Additional features and advantages of the systems and methods of the present invention will become evident to those of ordinary skill in the art after a study of the description, figures, and non-limiting examples in the present application.

DESCRIPTION OF EXEMPLARY EMBODIMENTS

The present invention provides systems and methods for adjusting the firmness and profile of a mattress assembly, and/or for modulating the pressure in a mattress assembly. In some embodiments and/or implementations, the mattress assembly may comprise a two-dimensional array of bladders, and the firmness and profile of the mattress assembly may be controlled and/or adjusted by the degree to which the bladders are inflated (or deflated). In some embodiments and/or implementations, the array of bladders may be provided either at or near the uppermost surface of a mattress assembly.

Further, in accordance with the systems and methods of the present invention, a mattress assembly is provided with an adaptable sleep surface, wherein the firmness of the sleep surface and/or of the mattress assembly may be adjusted, for example, in response to user input, applied pressure, change(s) in pressure, predetermined pressure schemes and/or routines, auditory stimuli, various other stimuli, and/or any combination thereof.

In some embodiments, the mattress assembly of the present invention comprises a spring mattress, such as an inner spring mattress and/or a pocketed spring mattress. The mattress assembly may be adapted to be supported on a base, such as, for example, a frame, a box springs, or even on the floor. In some embodiments, the mattress assembly includes a planar or substantially planar base arranged parallel to an opposing surface layer. The surface layer may comprise an elastic, conformable, and/or deformable material. And, in certain embodiments, the surface layer is deformable relative to the base. Accordingly, in some embodiments, the movement of the bladders described herein causes the surface material of the mattress assembly to move in a wave-like fashion. This movement of the surface material is both highly controllable and highly conformable and may be manipulated by controlling the movement of the bladders.

Further, in some embodiments, the mattress assembly of the present invention comprises a two-dimensional array of expandable bladders, wherein each bladder represents a node within the array. An array of bladders is coupled to a base and/or other layer of a mattress assembly and provided between the base and the surface layer of the mattress, that is within the mattress assembly. Each of the bladders is movable within the mattress assembly, for example, as the bladder expands or contracts and/or is inflated or deflated, respectively.

Figure 1:
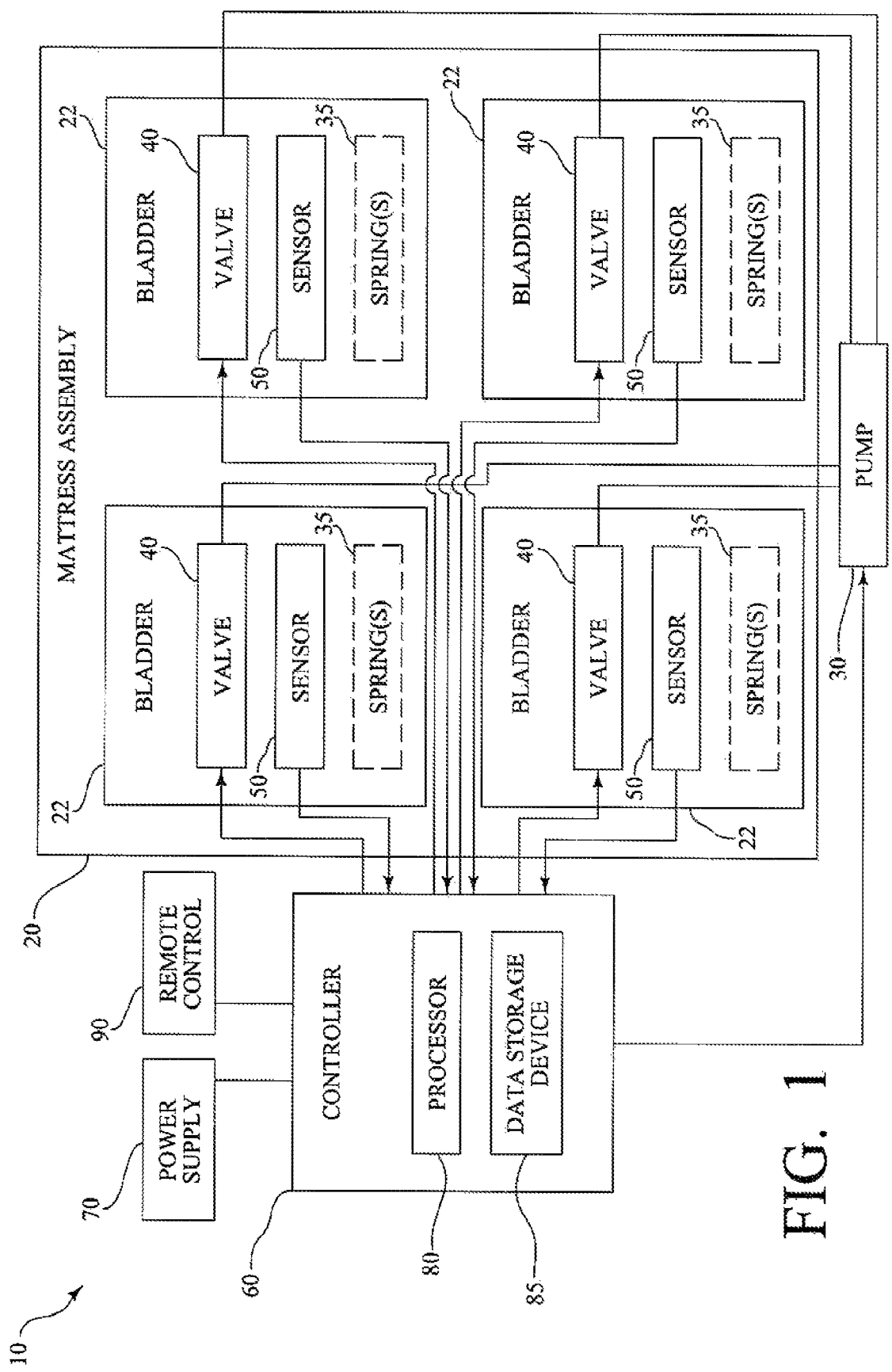
FIG. 1 is a schematic diagram of an exemplary system for adjusting the firmness of a mattress assembly made in accordance with the present invention.

Referring first to FIG. 1, an exemplary system 10 for adjusting the firmness of a mattress assembly is provided that includes a mattress assembly 20 with an array of bladders 22. In FIG. 1, four identical bladders 22 are illustrated in a 2×2 array. However, any number of bladders 22 may be incorporated in the array without departing from the spirit and scope of the present invention. Furthermore, there may be differences in the construction of the respective bladders 22 without departing from the spirit and scope of the present invention; for instance, any or all of the bladders 22 in the array may comprise a bellows, an elastic chamber, an air-tight chamber, and/or a water-tight chamber.

In some embodiments of the present invention, one or more of the bladders 22 in the array may be connected directly or indirectly to any of the other bladders 22 in the array. For example, in some embodiments, at least one bladder 22 is in fluid communication with at least one other bladder 22 in the mattress assembly 20. Indeed, the bladders 22 may be networked together throughout any portion of the system 10 and/or throughout the entire system 10. In any event, the movement of the bladders 22 in the mattress assembly is controlled by a controller 60, as further described below.

Referring still to FIG. 1, the exemplary system 10 also includes at least one pump 30 or a similar fluid/air source that is in fluid communication with the bladders 22 to provide air and/or fluid to the bladders 22 and, in turn, inflate the bladders 22. Similarly, the system 10 includes multiple valves 40 that are interposed between the pump 30 and the bladders 22 to control the flow of air and/or fluid to or from the bladders 22. In FIG. 1, each bladder 22 is illustrated with its own valve 40, the importance of which is discussed below; however, such one-to-one correspondence is not necessary, as a single valve 40 could be associated with multiple bladders 22 that are in fluid communication with one another, or multiple valves could be associated with multiple pumps to divide an array of bladders into different sides or into even further discrete zones within the array of bladders. Such arrangements can make use of pneumatic pump(s) and/or hydraulic pumps as well as both three-way and two-way valves (e.g., for use with a hydraulic pump where fluid is either allowed to flow back and forth or is closed off to de-energize the pump).

Referring still to FIG. 1, the exemplary system 10 also includes pressure sensors 50 that are associated with and connected to one or more of the bladders 22, and which collect and provide pressure change data that can be used to adjust the firmness and/or profile of the mattress assembly 20. In some embodiments, each pressure sensor 50 is integrated into or on a surface of a respective bladder 22, and, in some embodiments, each pressure sensor 50 is on or near an external surface of the mattress assembly 20. In use, each pressure sensor 50 can be used to measure a surface pressure at the top surface of the bladders 22 and correlate that surface pressure to the pressure felt by a user, but each pressure sensor 50 will generally detect an inflation level and/or an internal pressure of a respective bladder 22, communicating that data to the controller 60. Thus, the pressure and/or positional feedback from each pressure sensor 50 can be used to determine whether to inflate or deflate one or more of the bladders 22, as further described below. In other words, the feedback from the pressure sensors 50 may be used to either raise or lower the height of the sleep surface of the mattress assembly 20 and/or to change the firmness locally with respect to one or more bladders 22 within the array.

Indeed, in certain embodiments, the mattress assembly 20 is divided into zones, wherein each zone comprises one or more bladders 22 (or nodes) within the array. In some embodiments, a zone according to the present invention comprises two or more adjacent bladders 22 (or nodes). In other embodiments, a zone according to the present invention comprises two or more non-adjacent bladders 22 (or nodes). The number of zones is limited only by the number of nodes in the array and can be defined by user input or by a controller-implemented routine. Conversely, in some embodiments, systems and methods of the present invention allow for the establishment of a global firmness or profile across the entire mattress assembly 20. Thus, the present invention provides systems and methods for either a global firmness or profile setting or for the adjustment of firmness or profile across one or more zones of the mattress assembly.

Moreover, the systems and methods of the present invention provide a mattress assembly and sleep system that allows for adjustment of firmness or profile in a full two-dimensional (2D) array. In some embodiments, the two-dimensional array is rectangular in shape, and in some embodiments, the two-dimensional array is square in shape. Further, the flexibility and elasticity of the bladders 22 provided in the present invention allow for a large amount of vertical displacement at each node of the array as the pressure within the bladders 22 is varied. This vertical displacement can be precisely controlled at any two-dimensional location within the array of bladders 22 to create a high degree of conformance of the surface of the mattress assembly 20 with a user's body.

Each bladder 22 advances, for example to an extended position, when the pressure in the bladder increases and/or retracts, for example, to a retracted position, when the pressure in the bladder 22 is reduced. Indeed, the bladders 22 may rise and fall with increases and/or decreases in the internal bladder pressure. In some embodiments, at least one bladder 22 of the present invention expands and/or contracts in at least one dimension by between about 0.01-100 cm, 0.1-50 cm, and/or about 1-20 cm as its internal pressure is varied. Further, the bladders 22 are positioned such that their movement causes at least one external surface of the mattress assembly 20 to move. Accordingly, in some embodiments, the bladders 22 are operably coupled to at least one external surface of the mattress assembly 20.

Referring again to FIG. 1, in this exemplary system 10, at least one spring 35 is also provided in each bladder 22 in the array. Thus, the bladder 22 is effectively serving as a flexible enclosure for a pocketed spring. For further description of pocketed springs (or pocketed coils), reference is made to U.S. Pat. No. 7,908,693, which is incorporated herein by reference. In any event, providing one or more springs within a bladder 22 may be useful, for example, in improving "bounce" of a mattress assembly. Such springs may be, for example, a tension spring, a coil spring, and/or a compression spring.

Figure 4:
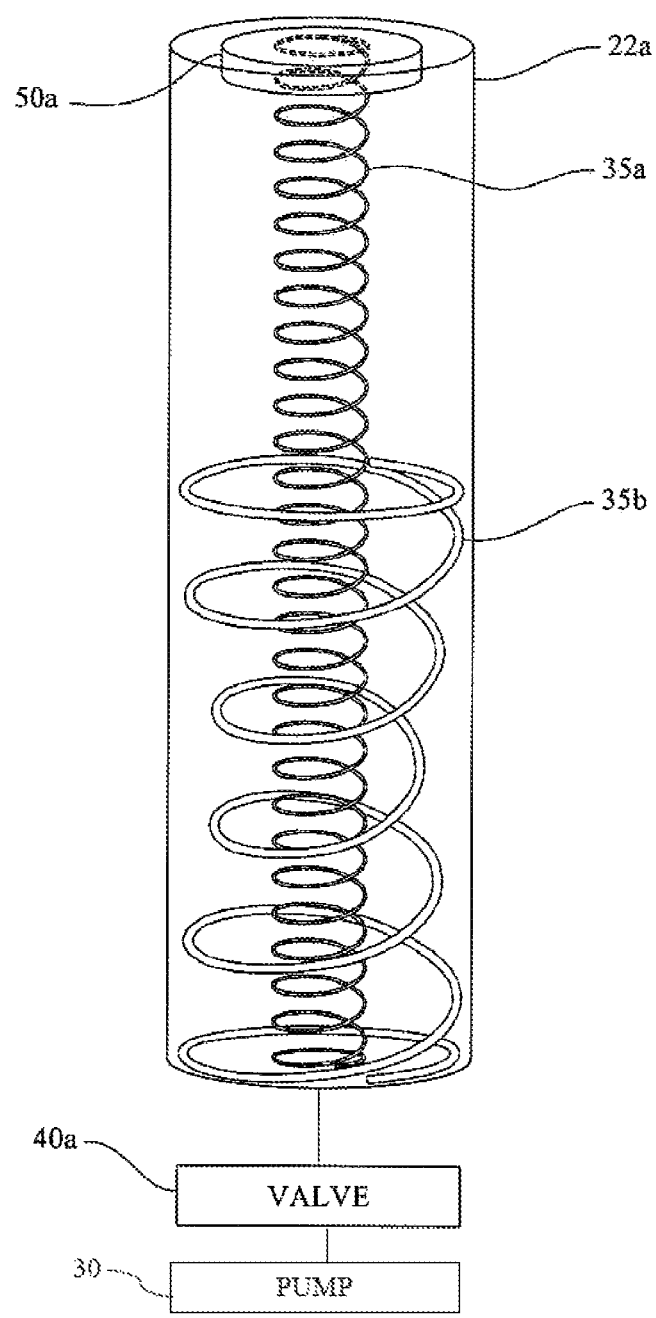
FIG. 4 is an exemplary bladder including a spring for use in the systems and methods of the present invention.

Referring now to FIG. 4, in certain embodiments, a first spring 35a and a second spring 35b are positioned inside of a bladder 22a, with the first spring 35a and the second spring being concentrically arranged. The first spring 35a is a tension spring that extends the height of the bladder 22a and is under tension as pressure is increased in the bladder 22a, but yet also maintains a fixed distance between the top and bottom of the bladder 22a that is equal to the height of the compression spring when no internal forces are applied to the bladder 22a. The second spring 35b, on the other hand, is a compression spring which extends from the floor of the bladder 22a a predetermined distance, and which ensures that the bladder 22a does not "bottom out" if a force (e.g., the weight of the user) is applied to the top of the bladder 22a. In the exemplary embodiment illustrated in FIG. 4, the first spring 35a is positioned within the body of the second spring 35b. Furthermore, as discussed above, each bladder 22a includes a valve that controls the flow of air and/or fluid to or from the bladder 22a, along with a pressure sensor 50a.

Referring again to FIG. 1, and as referenced above, the system 10 also includes a controller 60, such as a programmable logic controller (PLC). The controller 60 is connected to a power supply 70 and communicates with the pump 30, each of the valves 40, and each of the pressure sensors 50. The controller 60 is configured to selectively actuate the pump 30 and one or more of the valves 40, while receiving feedback from the pressure sensors 50, in order to adjust the firmness and/or profile of the mattress assembly. The controller 60 may be configured, for example, to receive and/or administer a selection of one or more routines (i.e., a program of instructions stored in a data storage device 85 for the controller 60), which function to control the inflation and deflation of the respective bladders 22 via the valves 40.

In certain embodiments, various routines may be used, for example, to introduce waves, pulses, or other more complex contours to the sleep surface to improve the interaction between the user and the mattress assembly 20. For instance, in some embodiments, a routine is directed to a selected timing sequence for modulating, inflating, and/or deflating certain bladders 22 in a predetermined sequence, and is also directed, in certain embodiments, to collecting pressure change and/or positional data from the pressure sensors 50. In this regard, and as mentioned above, such routines are typically stored in a data storage device 85 associated with the controller 60. When a particular routine is selected, a processor 80 associated with the controller 60 executes the instructions and outputs a control signal to the pump 30 and/or one or more valves 40 to inflate or deflate one or more bladders 22, and further receives feedback from one or more of the pressure sensors 50 to control the timing of the pressure change. In some embodiments, the controller 60 directs a pressure change in a plurality of bladders 22 in a determined sequence in order to form a wave-like motion that moves across all or a portion of an external surface of the mattress assembly 20.

In certain embodiments, feedback provided to the controller 60 may be used to direct either a raising or lowering of the height of at least a portion of a sleep surface of the mattress assembly 20 and/or to change the firmness locally with respect to one or more bladders 22 within the array.

With respect to the processor 80, the term "processor" is used to describe one or more microprocessors, microcontrollers, central processing units, Digital Signal Processors (DSPs), Field-Programmable Gate Arrays (FPGAs), Application-Specific Integrated Circuits (ASICs), or the like for executing instructions stored on the data storage device 85.

With respect to the data storage device 85, the term "data storage device" is understood to mean physical devices (computer readable media) used to store programs (sequences of instructions) or data (e.g., program state information) on a non-transient basis for use in a computer or other digital electronic device, including primary memory used for the information in physical systems which are fast (i.e., RAM) and secondary memory, which are physical devices for program and data storage which are slow to access but offer higher memory capacity. Traditional secondary memory includes tape, magnetic disks and optical discs (CD-ROM and DVD-ROM).

The term "memory" is often (but not always) associated with addressable semiconductor memory, i.e. integrated circuits consisting of silicon-based transistors, used for example as primary memory, but also other purposes in computers and other digital electronic devices. Semiconductor memory includes both volatile and non-volatile memory. Examples of non-volatile memory include flash memory (sometimes used as secondary, sometimes primary computer memory) and ROM/PROM/EPROM/EEPROM memory. Examples of volatile memory include dynamic RAM memory, DRAM, and static RAM memory, SRAM.

Accordingly, and referring again to FIG. 1, the present invention provides, in some embodiments, a system 10 for adjusting the firmness and/or profile of a mattress assembly 20, comprising: (i) a mattress assembly 20 including a two-dimensional array of bladders 22; (ii) at least one spring 35 provided within each of the bladders 22; (iii) at least one pump 30 that is in fluid communication with the bladders 22 to provide air and/or fluid to the bladders 22; (iv) multiple valves 40 that are interposed between the pump 30 and the bladders 22 to control the flow of air and/or fluid to or from the bladders 22; (v) a pressure sensor 50 operably connected to one or more of the bladders 22; and (vi) a controller 60 in communication with the pump 30, the valves 40, and the pressure sensors 50. In some embodiments, the controller additionally comprises and/or communicates with a power supply 70, a data storage device 85, a processor 80, and/or a remote control 90.

In some embodiments, to provide control over the pump 30 and the valves 40, as well as the inflation and deflation of the bladder 22, the pressure sensors 50 included in the mattress assembly 20 directly measure the pressure in one or more bladders 22 and then operate to communicate data relating to the pressure in the one or more bladders 22 to the controller 60 at a particular time point identified by a routine (e.g., subsequent to a user resting on the sleep surface of the mattress assembly 20, as the bladder 22 is deflating, etc.). In response to that pressure data, the controller 60 can then store and utilize the data gathered at various time points to calculate an increase in pressure, a decrease in pressure, a rate of change in pressure, or combinations thereof, which may then be used to adjust the firmness of the mattress assembly 20 and/or modulate the pressure in the mattress assembly 20 as desired.

In some embodiments of the present invention, a user selects a routine, which can be initiated from a remote control 90 and communicated to the controller 60. The routine may then be initiated by the controller 60, and proceed through a series of steps in which the bladders 22 are selectively inflated and deflated and/or in which pressure change data is collected. For example, in one preferred routine according to the present invention, the controller 60 initially sends an output signal to the valve 40 to open and inflate a particular bladder 22. Next, the pressure sensor 50 measures the air (or fluid) pressure in the bladder 22 subsequent to the initial inflation and communicates the measured air (or fluid) pressure to the controller 60. In turn, the controller 60 then determines an amount of increase in air (or fluid) pressure in the bladder 22 and/or further determines the rate of change in the air (or fluid) pressure.

Figure 2:
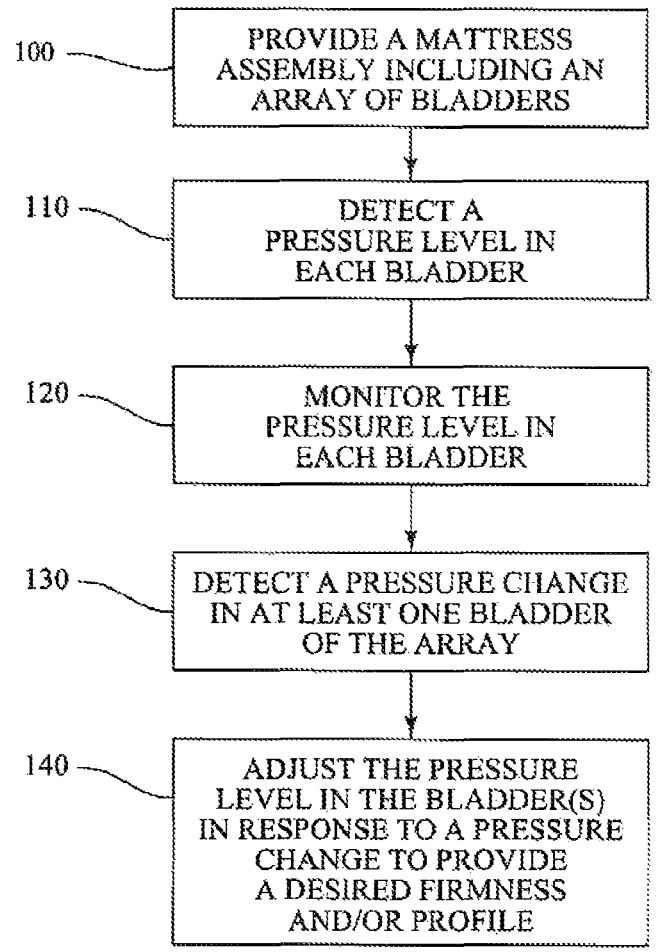
FIG. 2 is a flowchart illustrating an exemplary implementation of a method for adjusting the firmness of a mattress assembly in accordance with the present invention.

Referring now to FIG. 2, the present invention also provides methods for adjusting the firmness and/or profile of a mattress assembly, comprising, for example, the steps of: (i) providing a mattress assembly comprising an external sleep surface and an internal two-dimensional array of bladders (step 100); (ii) detecting a pressure level in each bladder (step 110); (iii) monitoring a pressure level in each of the bladders (step 120) to detect a pressure change in at least one bladder of the array (step 130); and (iv) adjusting the pressure level in the bladder(s) in response to a pressure change to provide a desired firmness or profile (step 140). With respect to such methods, and referring again to FIG. 4, in some implementations, a first (tension) spring 35a and a second (compression) spring 35b are positioned inside of each bladder 22a and concentrically arranged.

As discussed above, the pressure in a single bladder provided in the array may be increased and/or decreased without affecting the pressure in any other bladder in the array. In other words, in certain embodiments, the bladders provided in an array within the mattress assembly can function independently. Meanwhile, in other embodiments, the bladders within the array work together and/or function simultaneously to provide, for example, a wave-like motion on the surface of the mattress assembly. Furthermore, in some implementations, the desired firmness is a predetermined pressure level provided by user input. In other implementations, the desired firmness is a predetermined pressure level provided by a routine.

Figure 3:
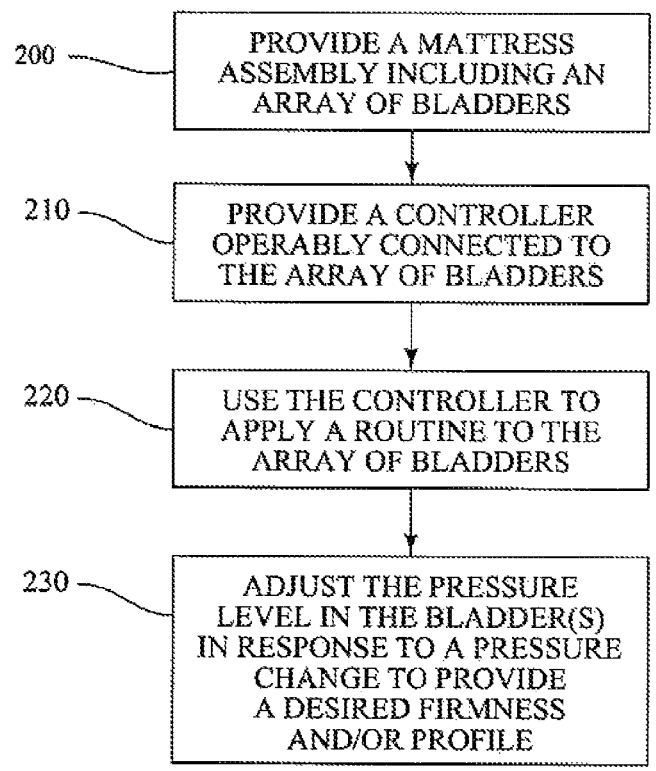
FIG. 3 is a flowchart illustrating an exemplary implementation of a method for modulating the pressure in a mattress assembly as provided in the present invention.

Referring now to FIG. 3, the present invention also provides methods for modulating the firmness of a mattress assembly, comprising, for example, the steps of: (i) providing a mattress assembly comprising an external sleep surface and an internal two-dimensional array of bladders (step 100); (ii) detecting a pressure level in each bladder (step 200); providing a controller that is operably connected to the array of bladders (step 210), wherein the controller stores and receives a selection of one or more routines directed to a selected timing for inflating and deflating one or more bladders in the array; and (iii) using the controller to apply one more of the routines to the array of bladders (step 220) in order to adjust a pressure level in at least one bladder in the array (step 230). With respect to such methods, and referring again to FIG. 4, in some implementations, a first (tension) spring 35a and a second (compression) spring 35b are positioned inside of each bladder 22a and concentrically arranged.

One of ordinary skill in the art will recognize that additional embodiments or implementations are possible without departing from the teachings of the present invention or the scope of the claims which follow. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A method for adjusting the firmness and/or profile of a mattress assembly, comprising the steps of:
   providing a mattress assembly comprising an external sleep surface and an internal two-dimensional array of vertically oriented bladders, a first inner vertically oriented spring within each of the vertically oriented bladders, a second outer vertically oriented spring provided within each of the vertically oriented bladders separate of the first inner vertically oriented spring, said second outer vertically oriented spring having a shorter height than said first inner vertically oriented spring, and said second outer vertically oriented spring varying in diameter from larger diameters at upper and lower ends to a smaller diameter between the upper and lower ends, wherein the second outer vertically oriented spring is a compression spring and the first inner vertically oriented spring is a tension spring;
   detecting a pressure level in each of said vertically oriented bladders, said pressure level created by at least one pump in fluid communication with the internal two-dimensional array of vertically oriented bladders, wherein at least one valve is associated with each of said vertically oriented bladders to control flow of air and/or fluid between said at least one pump and each of said vertically oriented bladders;
   monitoring said pressure level in each of the vertically oriented bladders to detect a pressure change in at least one bladder of the internal two-dimensional array; and
   adjusting the pressure level in the at least one bladder of the internal two-dimensional array in response to a pressure change in the at least one bladder of the internal two-dimensional array to provide a desired firmness and/or profile.

2. The method as recited in claim 1, wherein at least one spring is provided within each of the vertically oriented bladders.

3. The method as recited in claim 2, and further comprising a first spring and a second spring positioned within each of the vertically oriented bladders.

4. The method as recited in claim 1, wherein each bladder is operably connected to the at least one valve for flow of air and/or fluid to and from the bladder.

5. The method as recited in claim 4, wherein the at least one valve is in communication with a controller, which outputs a signal to the at least one valve to adjust the pressure level in the at least one bladder of the internal two-dimensional array to provide the desired firmness and/or profile.

6. The method as recited in claim 1, wherein the desired firmness and/or profile is a predetermined pressure level provided by user input.

7. The method as recited in claim 1, wherein the desired firmness and/or profile is a predetermined pressure level provided by a routine.

8. The method as recited in claim 7, wherein the at least one valve is in communication with the controller, which outputs a signal to the at least one valve to adjust the pressure level in the at least one bladder of the internal two-dimensional array.

9. A method for modulating a predetermined pressure in a mattress assembly, comprising the steps of:

providing a mattress assembly comprising an external sleep surface and an internal two-dimensional array of vertically oriented bladders, a first inner vertically oriented spring within each of the vertically oriented bladders, a second outer vertically oriented spring provided within each of the vertically oriented bladders separate of the first inner vertically oriented spring, said second outer vertically oriented spring having a shorter height than said first inner vertically oriented spring, and said second outer vertically oriented spring varying in diameter from larger diameters at upper and lower ends to a smaller diameter between the upper and lower ends;

detecting a pressure level in each of said vertically oriented bladders;

providing a controller that is operably connected to the array of vertically oriented bladders, wherein the controller stores and receives a selection of one or more routines directed to a selected timing for inflating and deflating one or more bladders in the array of vertically oriented bladders; and using the controller to apply one more of the one or more routines to the array of vertically oriented bladders in order to adjust said pressure level in at least one bladder in the array of vertically oriented bladders.

10. The method as recited in claim 9, and further comprising a first spring and a second spring positioned within each of the vertically oriented bladders in concentric arrangement.

11. The method as recited in claim 10, wherein the first spring is a tension spring and the second spring is a compression spring.

12. The method as recited in claim 11, wherein each bladder is operably connected to at least one valve for flow of air and/or fluid to and from the bladder.

* * * * *